Patented Mar. 29, 1949

2,465,979

UNITED STATES PATENT OFFICE 2,465,979

N-SUBSTITUTED AMIDES OF 2-HYDROXY-3-NAPHTHOIC ACIDS

Henry Philip Orem, North Plainfield, and Frederic Henry Adams, Bound Brook, N. J., and John Paul Goulding, Shepherdstown, W. Va., assignors to American Cyanamid Company, New York, N. Y., a corporation of Maine No Drawing. Application September 16, 1947, Serial No. 774,412

3 Claims. (Cl. 260—338)

This invention relates to new compounds useful as intermediates in the preparation of new coloring matters. More particularly, this invention relates to new arylides of 2-hydroxy-3-naphthoic acid useful as coupling components in the preparation of azo coloring matters. Specifically, the invention relates to N-substituted amides of 2-hydroxy-3-naphthoic acid, the amides being those of 6-aminobenzo-1,3-dioxan and 6-aminobenzo-1,4-dioxan, which amides may be represent by the following formulae:

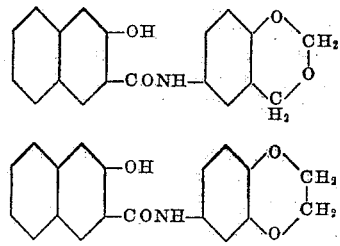

The invention also relates to methods of preparing these intermediates, to methods of preparing coloring matters from them and to the coloring matters so prepared.

The instant application relates to the new arylides per se. Insoluble coloring matters, particularly ice colors and pigments of unusual shades and solubility properties, may be derived from them. These new dyestuffs comprise the subject matter of our copending application, Serial No. 774,413, filed of even date.

Many arylides of 2-hydroxy-3-naphthoic acid have been known. Many have been suitable for coupling to diazo compounds in the production of coloring matters useful for various purposes. In general, however, coloring matters so produced, particularly from simple, generally-available amines, are not satisfactory for general use in surface coatings. For such use, high resistance to the solvent action of the vehicle, i. e., linseed oil, varnish, lacquer solvents and the like, is essential. Lack of such resistance causes undesirable "bleeding," i. e., color penetration, or staining or over-running of one color upon an adjacent color. A typical illustration is the pigment prepared by coupling paranitroaniline upon 2-hydroxy-3-naphthoic anilide. This product "bleeds" very badly in linseed oil. Nevertheless, because of other desirable properties, arylides derived from 2-hydroxy-3-naphthoic acid remain desirable for use. There remains, then, an unsatisfied demand in the art for such arylides, capable of ready coupling to a diazo component to produce coloring matters not deficient in bleed resistance.

It is, therefore, one of the principal objects of the present invention to produce new arylides capable of satisfying this demand, arylides which when coupled to a suitable diazo component produce insoluble coloring matters having a high resistance to bleeding. It is also an object of the present invention to produce arylides which are otherwise satisfactory for use in producing new azo dyestuffs and pigments of novel color shade and good general fastness properties.

In general, these objects have been accomplished in producing the new arylides of the present invention. These amides derived from 2-hydroxy-3-naphthoic acid and the 6-amino-1,3- and 1,4-benzodioxan may be readily coupled with diazo compounds to produce coloring matters of good wash and light fastness. In addition, and in view of the behavior of previously-known arylides quite unpredictably, these colors possess marked resistance to bleeding, particularly toward oils such as linseed oil and the like. For example, the pigment prepared from diazotized paranitroaniline and the 2-hydroxy-3-naphthoyl derivative of 6-aminobenzo-1,3-dioxan shows excellent bleed resistance in sharp contrast to the corresponding pigment from the anilide of 2-hydroxy-3-naphthoic acid. This property of the new arylides to produce such colors, particularly from simple amines which heretofore could not be used to obtain such products, is of marked industrial importance.

The reasons for such striking difference in behavior between the arylides of this invention and those previously known is not well understood. Accordingly, it is not intended to limit the present invention to any theory of mode of action.

It is an advantage of the present invention that the new arylides are readily prepared by simple methods requiring no extraordinary precautions as to the process or requirements as to apparatus. In general, the preparation consists in the condensation of 2-hydroxy-3-naphthoic acid with 6-amino-1,3- (or -1,4-) benzodioxan. If so desired, a suitable derivative of the acid may be used. This condensation may be effected by any of the well known methods. For example, the reaction may be carried out in an aromatic hydrocarbon solvent in the presence of phosphorous trichloride. Another procedure is by the reaction with a 2-hydroxy-3-naphthoyl halide in pyridine.

The new products are colorless to pale yellow solids, insoluble in water, but easily soluble in aqueous alkali to give yellow solutions. They are appreciably soluble in various organic solvents, particularly when hot, and may be recrystallized therefrom.

The invention will be more fully illustrated in conjunction with the following examples which are meant to be illustrative only and not by way of limitation. All parts are by weight unless otherwise noted.

Example 1

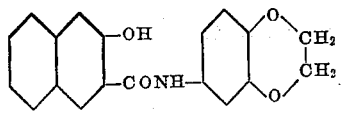

A mixture of 316 parts of monochlorobenzene and 37 parts of 2-hydroxy-3-naphthoic acid is heated to the boil, and boiling is continued until approximately 30 parts of monochlorobenzene have distilled over to dehydrate the mixture. The temperature is then lowered to 100° C., and 30 parts of 6-amino-1,3-benzodioxan are added. There is then added to this mixture over a period with constant stirring, 11 parts of phosphorous trichloride. A thick slurry results, which is heated with stirring at 100°-105° C. for about 1.5 hohrs, during which time hydrochloric acid gas is evolved. The temperature is then gradually raised to boiling and the mixture is gently boiled under reflux until essentially no more hydrochloric acid gas is evolved. After lowering the temperature to 25° C., the crude, insoluble product is filtered off. It is washed twice with 33 parts of monochlorobenzene, four times with 50 parts of hot 2% sodium bicarbonate solution, and finally with large quantities of hot water. The crude material is dried at low temperature. This material is partially purified by slurrying in hot sodium carbonate solution (2% strength), filtering and washing with water. Pure 6-(2'-hydroxy-3'-naphthoylamino)-1,3-benzodioxan is obtained by crystallization from glacial acetic acid, and melts at 254° C.

Example 2

9.4 parts of 6-amino-1,3-benzodioxan and 15.5 parts of the acid chloride from 2-hydroxy-3-naphthoic acid are dissolved in 39 parts of pyridine. The mixture is refluxed for two hours, the resulting clear solution is allowed to cool, and is poured into 150 parts of cold water. The precipitate which is thus formed is filtered off and washed well with water. The 6-(2'-hydroxy-3'-naphthoylamino)-1,3-benzodioxan is purified by slurrying in sodium carbonate solution, filtering, washing with water and drying. It is rendered chemically pure by crystallization from glacial acetic acid. It is very soluble in puridine and in hot glacial acetic acid, and slightly soluble in alcohol but almost completely insoluble in water.

In accordance with the present invention dyestuffs may be produced in substance or on a substrate and used as pigments; or they may be prepared on textile materials according to the procedures commonly used for the production of ice colors upon fiber. For example, cellulosic materials may be impregnated or padded with an alkaline solution of one of the arylides of the present invention, and the cloth thus impregnated may be either dyed by immersion in a properly buffered solution of a diazo compound or printed with a paste containing a diazonium salt in solution. Another method of utilization of the products of the present invention consists in mixing the arylide together with a water-soluble diazo "amino" or diazo "imino" compound with sufficient alkali and a thickener to form a printing paste, printing this paste upon the fiber, and then exposing the printed fabric to the hot vapors of organic acids, such as acetic or formic acid, to develop the color upon the printed pattern. Still another method comprises mixing the arylides with diazo sulfonates and an oxidizing agent, dissolving the mixture in dilute alkali, thickening the solution with a suitable thickener, printing upon cellulosic materials, and developing the color on the fiber by treatment with steam in the presence of weak acid vapors.

It is a further advantage of the arylides of the present invention that they may be coupled with an azo derivative of substantially any aromatic monoamine or diamine free from solubilizing substituents, such as the sulfonic and carboxylic acid groups, capable of being diazotized or tetrazotized and coupled to form azo dyestuffs. Thus, the following bases are some typical examples: Aniline, its homologues, their halogen, nitro, alkoxy, aryloxy, acylamino, sulfon, sulfonamide and cyano derivatives, xenylamine, the naphthylamines, amino-azo compounds, benzidine, dianisidine, derivatives of 4,4'-diamino stilbene, etc. Furthermore, diamines in which one of the amino groups only can be diazotized such as 2,6-dichloro-1,4-phenylenediamine can be employed. If the amino compound contains more than one substituent, these may be either the same or different such as, for example, 2-methoxy-5-chloroaniline.

Typical illustrative procedures for the use of the arylides of the present invention in forming dyestuffs are set forth in the following examples. Again, all parts are by weight unless otherwise noted.

Example 3

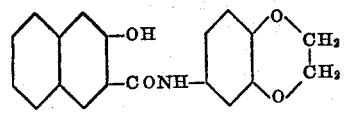

9.4 parts of 6-amino-1,4-benzodioxan and 15.5 parts of the acid chloride from 2-hydroxy-3-naphthoic acid are dissolved in 39 parts of pyridine. The mixture is refluxed for two hours, and the resulting solution, after cooling, is drowned in 150 parts of water, and filtered. The precipitate is washed with water, slurried in 2% bicarbonate solution, filtered again and washed again with water. It is dried at 100° C. 6-(2'-hydroxy-3'-naphthoylamino)-1,4-benzodioxan is further purified by dissolving in sodium hydroxide solution, clarifying with decolorizing carbon, and precipitating with dilute hydrochloric acid, followed by washing with water and drying. Thus purified, the product melts at 207°-208° C. It is a colorless crystalline material similar in properties to the product obtained in the preceding example.

Example 4

An intimate mixture is made of 2.85 parts of the dipotassium salt of the stabilized diazo compound obtained by reacting the diazonium chloride from 2-amino-4-chloro anisole with guanylurea-N-sulfonic acid in alkaline medium according to U. S. Patent 2,154,470, and 2.02 parts of the coupling component prepared as described in Example 1.

Four parts of this mixture are intimately mixed with 5 parts of ethylene glycol mono-ethyl ether, 2.5 parts of 30° Bé. sodium hydroxide solution, and 18.5 parts of water. When solution is complete, 70 parts of a suitable starch thickener are added, and the whole is stirred until a smooth paste is obtained.

This paste is printed on cotton piece goods from an engraved copper roll, and the print thus made is dried at 60° C. It is then treated with steam in the presence of acetic acid vapors, rinsed, soaped at elevated temperature, rinsed again and dried. An intense bluish-red print of good fastness to washing and light is thus obtained.

The colors obtained by substituting stabilized diazo compounds prepared in a similar manner from aromatic amines other than 2-amino-4-chloro anisole are summarized below:

| Diazo Component | Color of Print |
|---|---|
| 5-Chlor-2-amino toluene | bluish red. |
| 4-Chlor-2-amino toluene | red. |
| Aniline | scarlet. |

*Example 5*

3.32 parts of the disodium salt of the stabilized diazo compound obtained by reacting the diazo compound from 2-amino-4-chloro toluene with guanylurea-N-sulfonic acid in alkaline medium according to U. S. Patent 2,154,470, and 2.1 parts of the coupling component obtained as described above in Example 3 are intimately mixed with 0.12 parts of neutralized and dried sulfonated castor oil. 4 parts of this mixture are made into a printing paste, printed and finished according to the method described in Example 4. A bluish red print of good strength, brightness and general fastness properties is obtained.

The colors obtained by substituting stabilized diazo compounds prepared in a similar manner from aromatic amines other than 2-amino-4-chloro toluene are summarized below:

| Diazo Component | Color of Print |
|---|---|
| 4-Chloro-2-amino anisole | blue-red. |
| 3-Chloroaniline | scarlet. |

*Example 6*

1.5 parts of 4-nitro-2-amino toluene are stirred in 50 parts of water and 3.1 parts of hydrochloric acid (1.19) are added. Diazotization is completed at 0°-5° C. by addition of 0.8 parts of sodium nitrite dissolved in 11 parts of water. To the diazo solution is added 1.4 parts of sodium acetate trihydrate.

3.3 parts of 6-(2'-hydroxy-3'-naphthoylamino)-1,3-benzodioxan are dissolved in 100 parts of water by the addition of 1.7 parts of sodium hydroxide at 80°-100° C. The temperature is lowered to 10° C. and the above prepared diazo solution is added over a 10-minute period. After stirring for one-half hour, add 3.4 parts of glacial acetic acid and filter off the deep red pigment. It is well washed with water on the filter and is dried at 50° C.

The bright red pigment has the following formula:

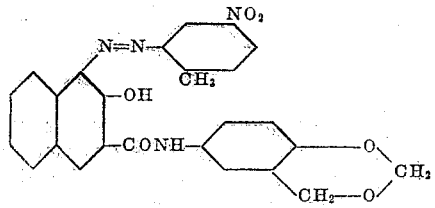

A sample of this pigment is thoroughly ground under linseed oil and the resulting paste is pressed on white, absorbent paper. There is no staining of the paper indicating that this pigment is essentially insoluble.

*Example 7*

1.7 parts of 4-nitro-2-amino anisole are stirred until well wetted in 50 parts of water. 3.1 parts of hydrochloric acid (1.19) are added and the temperature is lowered to 0°-5° C. Diazotization is completed by addition of 0.8 part of sodium nitrite dissolved in 10 parts of water, and the resulting solution is treated with 1.3 parts of sodium acetate trihydrate.

This diazo solution is gradually added at low temperature to an alkaline solution containing 3.3 parts of 6 - (2' - hydroxy - 3'-napthoylamino) - 1,3-benzodioxan, 100 parts of water and 1.6 parts of sodium hydroxide. The precipitated pigment is filtered off, washed on the filter with water and dried at 50° C.

The bright bluish-red pigment has the following formula:

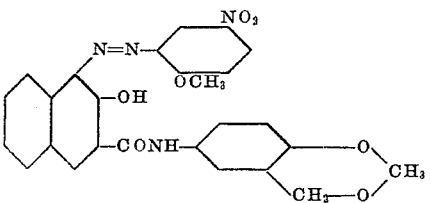

*Example 8*

When 1.4 parts of 4-nitraniline are substituted for the 4-nitro-2-amino anisole in the process of Example 7, a brilliant yellowish red pigment is obtained which has the following formula:

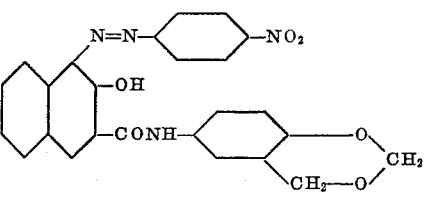

This pigment exhibits essentially no solubility or bleeding in linseed oil when examined as in Example 6.

*Example 9*

2 parts of 4-chloro-2-amino toluene hydrochloride are dissolved by heating in 4 parts of 17% hydrochloric acid and 50 parts of water. After lowering the temperature to 0°-3° C. the slurry is diazotized by gradual addition of 0.8 part of sodium nitrite in 10 parts of water. The resulting solution is clarified by filtration and the filtrate is diluted with water to a volume of 150 parts by volume. 15 parts by volume of this solution are diluted with 85 parts of cold water and 20% sodium acetate solution is run in until the solution is basic to Congo Red test paper. 5 parts of a cotton skein are wet out at 75° C.

in a 1% soap solution, rinsed and entered into a bath containing 1.0 part of 6-(2'-hydroxy-3' naphthoylamino) - 1,3 - benzodioxan, 4.6 parts ethanol, 5.2 parts of 20% sodium hydroxide and 400 parts of water. The skein is turned in this bath for ¼ hour, removed and passed through squeeze rolls.

The skein thus impregnated is entered into the buffered diazo bath prepared as described above and is turned until full color is developed. It is then rinsed, treated in ½% soap solution at 65° C., rinsed and dried. The cotton skein is strongly dyed a brilliant red color.

Additional cotton skeins impregnated in a similar manner and dyed in similar buffered diazo baths prepared from other aromatic amines produced shades as described below:

| Diazo Component | Color of Dyeing |
| --- | --- |
| 3-Chloroaniline | deep orange. |
| 2-Methoxy-5-nitraniline | scarlet. |
| 2-Methoxy-4-nitraniline | bluish red. |

We claim:
1. Chemical compounds represented by the formula:

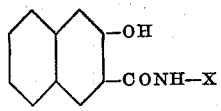

wherein X is a member selected from the group of beno-1,3-dioxan and benzo-1,4-dioxan radicals linked in the 6-position.

2. The chemical compound represented by the formula:

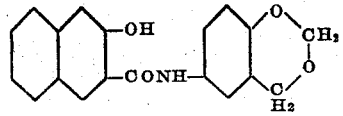

3. The chemical compound represented by the formula:

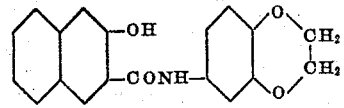

HENRY PHILIP OREM.
FREDERIC HENRY ADAMS.
JOHN PAUL GOULDING.

REFERENCES CITED

The following references are of record in the file of this patent:

UNITED STATES PATENTS

| Number | Name | Date |
| --- | --- | --- |
| 2,408,421 | Grimmel et al. | Oct. 1, 1946 |

OTHER REFERENCES

Heertjes, Chemical Abstracts, vol. 39, 1945, pages 3531 to 3532.

Certificate of Correction

Patent No. 2,465,979. March 29, 1949.

HENRY PHILIP OREM ET AL.

It is hereby certified that errors appear in the printed specification of the above numbered patent requiring correction as follows:

Column 3, line 36, Example 1, for "hohrs" read *hours*; column 6, line 43, Example 7, right-hand portion thereof, for "$CH_4$" read *$CH_2$*; column 8, line 1, claim 1, for "beno-1,3-dioxan" read *benzo-1,3-dioxan*;

and that the said Letters Patent should be read with these corrections therein that the same may conform to the record of the case in the Patent Office.

Signed and sealed this 11th day of October, A. D. 1949.

[SEAL]

THOMAS F. MURPHY,
*Assistant Commissioner of Patents.*